United States Patent [19]
Beckerman

[11] Patent Number: 5,210,975
[45] Date of Patent: May 18, 1993

[54] SEED-SPROUTING KIT

[76] Inventor: Jerold L. Beckerman, 5339 Bevis Ave., Sherman Oaks, Calif. 91411

[21] Appl. No.: 822,386

[22] Filed: Jan. 17, 1992

[51] Int. Cl.⁵ .......................... A01G 9/02; A01G 9/10
[52] U.S. Cl. .......................................... 47/56; 47/84
[58] Field of Search ............... 47/56, 84, 61, 73, 66, 47/14, 15; 206/423

[56] References Cited

U.S. PATENT DOCUMENTS

| | | | |
|---|---|---|---|
| 3,314,194 | 4/1967 | Halleck | 47/84 |
| 3,722,137 | 3/1973 | Kesinger et al. | 47/56 |
| 3,733,745 | 5/1973 | Ingerstedt et al. | 47/56 |
| 4,163,343 | 8/1979 | Schoenfeld | 47/56 |
| 4,209,945 | 7/1980 | Dent et al. | 47/84 |
| 4,291,499 | 9/1981 | Prewer | 47/56 |
| 4,292,761 | 10/1981 | Krave | 47/84 |
| 5,101,594 | 4/1992 | Ahm | 47/56 |

Primary Examiner—Richard E. Chilcot, Jr.
Assistant Examiner—Michele A. Van Patten

[57] ABSTRACT

First and second sheets of material laminated by preferably sealing the same both peripherally and intermediate the side edges thereof to form first and second packages. Prior to sealing, seeds are disposed within the first package, while in the second package there is disposed all of the elements necessary to insure sprouting of the seeds and includes a propagation-grade soil mixture. The packages are severed with the first package, when properly trimmed, forming a sprouting container within which the sprouting elements and seeds are placed and thereafter watered to insure sprouting of the seeds.

11 Claims, 4 Drawing Sheets

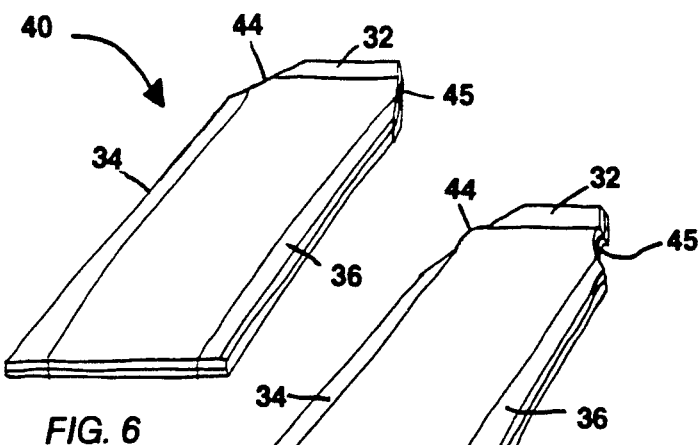
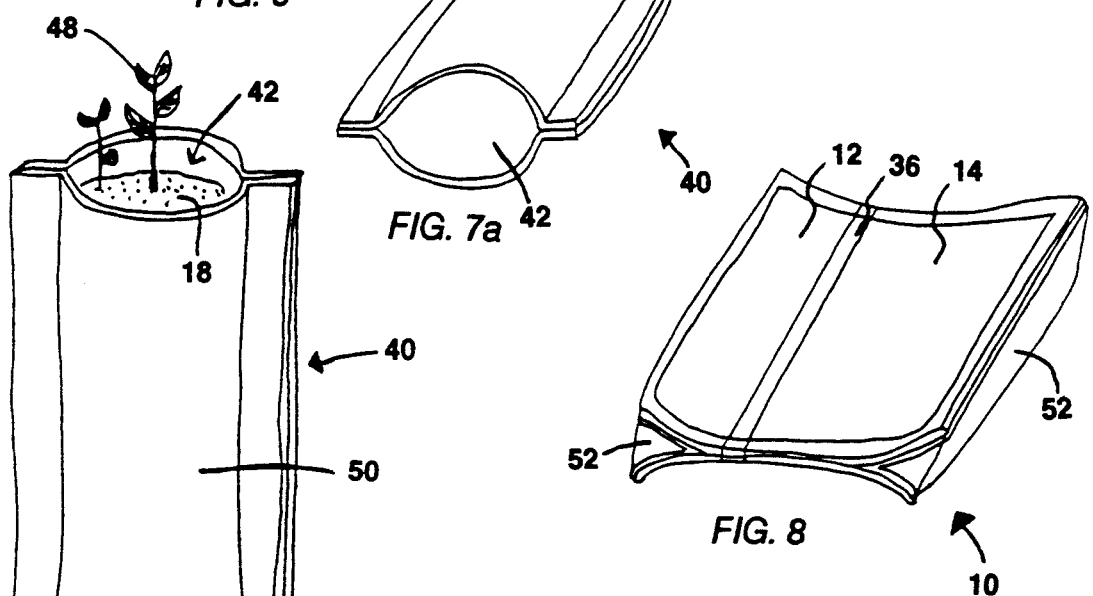
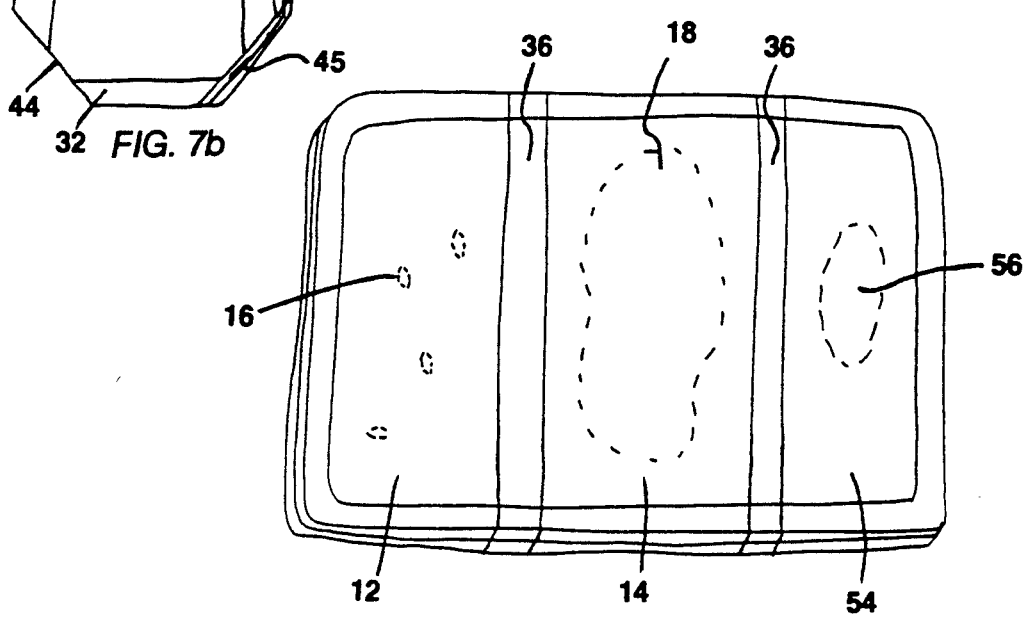

SEED-SPROUTING KIT

FIELD OF THE INVENTION

The present invention relates generally to the field of storing and sprouting seeds. Specifically, the present invention relates to a kit for maintaining seeds in dormancy and for sprouting the seeds.

BACKGROUND OF THE INVENTION

With increasing awareness of the environment and, in particular, increasing appreciation of the trees within the environment, growing trees has become very popular in recent times. Tree-growing from seeds is well known. However, it has generally been relegated to professional tree farms that typically grow thousands or tens of thousands of tree seedlings at a time. In contrast, small scale tree-seed propagation has not been widely explored and numerous factors have contributed to laypersons avoiding growing trees from seeds.

It is difficult for laypersons to procure the necessary elements, equipment, and know-how for growing tree seeds. Tree seeds are not readily available in retail, and sprouting tree seeds is substantially more difficult than sprouting typical garden-variety plant seeds. For instance, one of the most critical problems faced when sprouting tree seeds is overwatering. If the soil is too moist, the seeds will rot. If the soil is too dry, the seeds will not germinate. With success of the tree seed propagation dependent on numerous variables, it is very difficult for laypersons to sprout tree seeds. Likewise, it is very difficult to set forth a single set of instructions for laypersons to sprout tree seeds. Although tree-starter kits are known, such kits either are costly or have low success rates, as with well-known "match-book" seed packs.

Sprouting cells are also well known. Tree farms that grow trees from seeds typically sprout the seeds in rigid, cylindrically-shaped cells that are costly. Furthermore, being rigid, such prior art sprouting cells require substantial storage space and are difficult to cut open when the sprouted seeds require transplant into pots or other potting containers.

Thus, there is a need for a seed-sprouting kit that is directed for use by novice gardeners, schoolchildren, and the like, for growing plants and/or trees from seeds on a small scale. Specifically, there is a need for a seed-sprouting kit that provides elements, including seeds, soil, and a sprouting cell, necessary for sprouting seeds on a small scale.

SUMMARY OF THE INVENTION

The present invention is directed to a kit for maintaining seeds in dormancy and for sprouting the seeds.

In one embodiment of the invention, the kit comprises a first package configured for maintaining seeds dormant and for sprouting the seeds, and a second package severably attached to said first package for containing elements used to sprout the seeds.

The present invention is constructed from a sheet material, preferably laminated, which enables the first package to be easily cut or torn, or otherwise severed, from the second package. Being easily severed from the second package, the first package serves two purposes, one of maintaining the seeds in dormancy before being severed, and another of sprouting the seeds as a sprouter pocket after being severed.

The laminated sheet material from which the present invention is constructed also enables the first package as the sprouter pocket to maintain proper levels of moisture. That is, the sprouter pocket is easily configured by cutting or tearing to provide a plurality of fluid intake/drainage holes while retaining soil or other elements used to sprout the seeds. Furthermore, because the laminated sheet material is deformable, the present invention is simple and easily manufactured. The first package as a sprouting pocket is extremely compact when empty and can be stored without requiring substantial storage space or careful handling. As the laminated sheet material is substantially inexpensive, the present invention is extremely cost-effective over the prior art sprouting cells.

The present invention also provides for a second package severably attached from the first package which contains soil for filling the first package to sprout the seeds. Also being constructed from the laminated sheet material, the second package is easily severed from the first package by cutting or tearing, for enabling the first package to become a sprouting pocket. Conveniently, a user of the present invention need not purchase additional elements to sprout the seeds for all of the elements necessary for sprouting the seeds, except water, is provided in the present invention.

The present invention advantageously offers a tree-growing kit which is especially fun for children, novice tree-growers, or the like. Children, in particular will be entertained by the dual purpose of the first package, and tree-growers, whether or not professionals, will benefit from an inexpensive and convenient sprouting pocket which requires little storage space when empty.

These as well as other advantages of the present invention will become apparent from the detailed description which follows, considered together with the appended drawings.

BRIEF DESCRIPTION OF THE DRAWINGS

A preferred embodiment of the present invention is shown in the following drawings, in which like reference numerals indicate like parts and in which:

FIG. 6 is a perspective view of an empty sprouter pocket;

FIGS. 7a and 7b are perspective views of the sprouter pocket before and after being filled with soil and sprouting a tree seed, respectively;

FIG. 8 is a perspective view of the present invention constructed, with an additional panel;

FIG. 9 is a perspective view of the present invention constructed with an additional divider seal.

DESCRIPTION OF THE PREFERRED EMBODIMENTS

Figure 1:
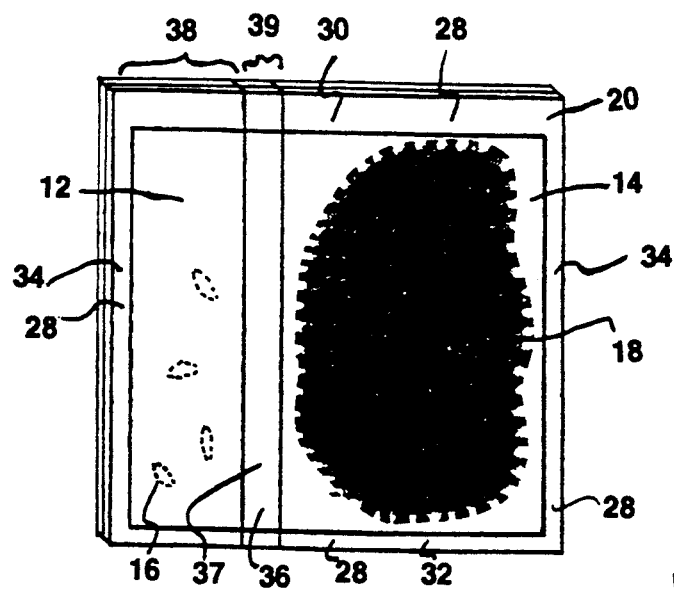
FIG. 1 is a perspective view of a seed-sprouting kit constructed in accordance with one embodiment of the present invention showing a first package severably attached to a second package.
Figure 2:
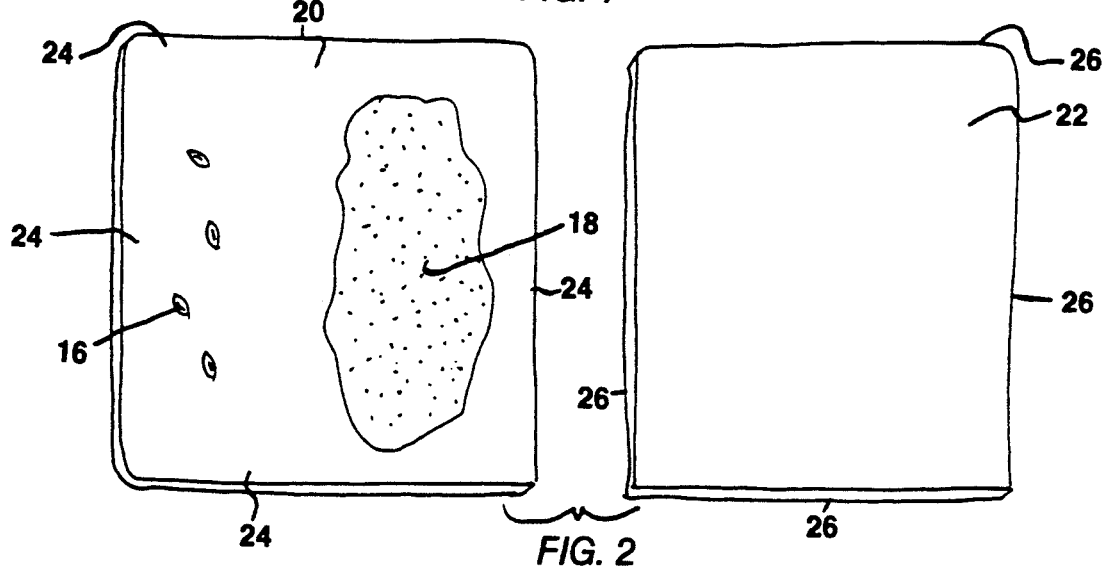
FIG. 2 is a perspective view of a first panel and a second panel of the present invention.

FIGS. 1 and 2 show generally a seed-sprouting kit 10 constructed in accordance with the present invention. The present invention 10, which is very efficient in terms of success rate and ease of execution, comprises a first package 12 and a second package 14, both constructed of a laminated, sheet material. The first package is configured for maintaining in dormancy a plurality of seeds 16 contained therein and for sprouting the seeds 16 upon being filled with soil 18, or the like, contained in the second package 14.

The laminated sheet material from which the present invention 10 is constructed comprises laminated substrate materials combined from paper and low density polypropylene, specifically, 45 pounds of polypropylene spread across 432,000 square inches of 35 pound paper. Other substrate materials such as 0.0003 inch aluminum foil, and/or 10 pounds of polyvinylidene chloride can be added for specific uses. Not only is the laminated sheet material extremely cost-effective, it enables the present invention to be simply and easily constructed. Being easily torn or cut, the laminated sheet material facilitates transforming the first package 12 into a sprouter pocket for sprouting the seeds 16.

The soil 18 contained in the second package 14 comprises a propagation-grade soil mixture, specifically, a combination of 34 percent propagation-grade non-pathogenic peat and 66 percent sterile perlite. Added to the propagation-grade soil mixture is eight ounces of polyoxyethelene ether for each cubic yard of the propagation-grade soil mixture. This particular mixture of soil ensures successful propagation of roots from the seeds 16 with minimal care and maintenance.

Figure 3:
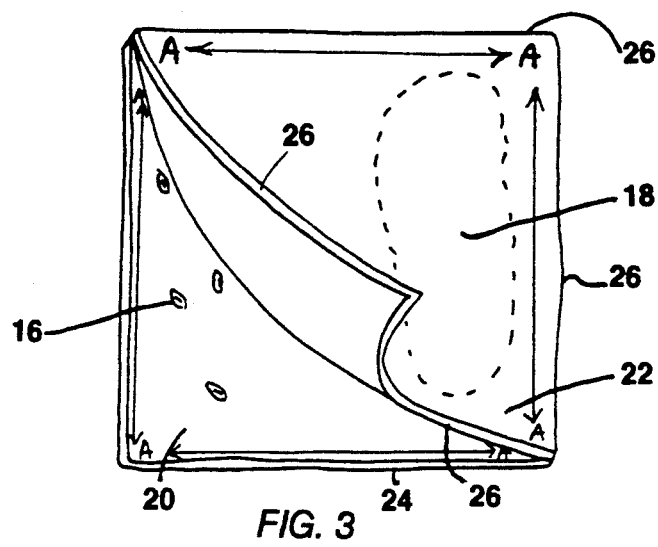
FIG. 3 is a perspective view of the second panel positioned to oppose the first panel.

Referring now specifically to FIGS. 2 and 3, in constructing the present invention 10, the seeds 16 and the soil 18 are positioned to rest on a first panel 20 constructed of the laminated sheet material. A second panel 22, also constructed of the laminated sheet material, is positioned to oppose the first panel 20, resting above the seeds 16 and the soil 18. Outer edges 24 of the first panel 20 are fixedly joined, preferably by heat sealing the lamination on the sheet material to outer edges 26 of the second panel 22, as shown by lines A—A, to form a continuous peripheral seal 28 (FIG. 1) around the combined panels. Having a top seal 30, a bottom seal 32 and two side seals 34 connecting the top and bottom seals 30, 32, the peripheral seal 28 maintains the present invention 10 air-tight and also partially forms the first package 12 and the second package 14.

To complete formation of the first and second packages 12, 14, a divider seal 36 joining, also preferably by heat sealing the lamination on the sheet material, a strip portion 37 of each of the first and second panels 20, 22 is provided. The divider seal 36 overlaps and extends between the top seal 30 and the bottom seal 32 to seal both the first and second packages 12 and 14, thereby segregating the seeds 16 and the soil 18.

The divider seal 36 is positioned a predetermined distance 38 from the side seal 34 so that when the first package 12 is transformed into the sprouter pocket, the sprouter pocket has a particular volume capacity for holding substantially all of the soil 18 contained in the second package 18.

In addition, the divider seal 36 has a width 39 for facilitating severing the first package 12 from the second package 14. Specifically, the width 39 enables the first package 12 to retain a portion of the divider seal 36 when the first package 12 is cut or otherwise severed from the second package 14, so that the former may remain sealed for forming the sprouter pocket.

Advantageously, the peripheral seal 28 and the divider seal 36 maintain the seeds 16 dormant and the soil 18 fresh. With the seals 28 and 36 intact, the present invention 10 can be stored for time periods affected only by the shelf-life of the seeds 16 and their respective storage conditions, such, for example as temperature, and yet be able to sprout the seeds 16 at any time.

Figure 4:
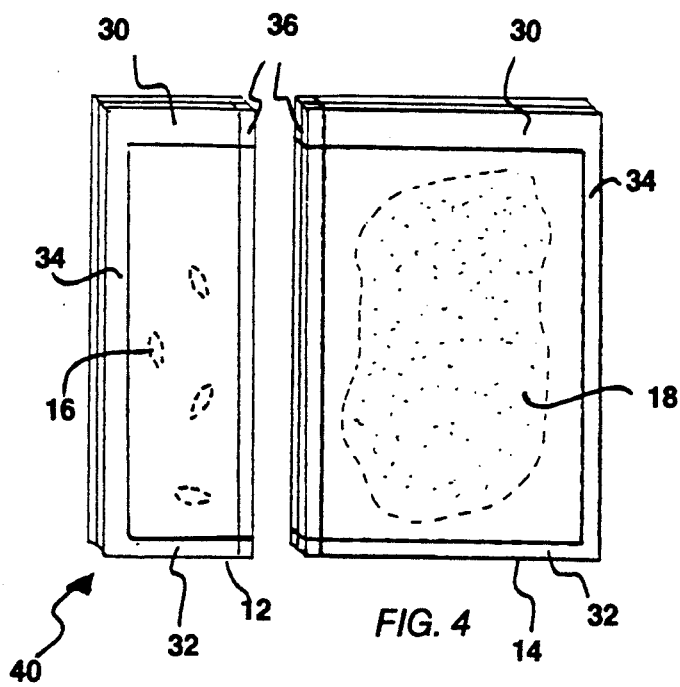
FIG. 4 is a perspective view of the present invention wherein the first package has been severably removed from the second package.
Figure 5:
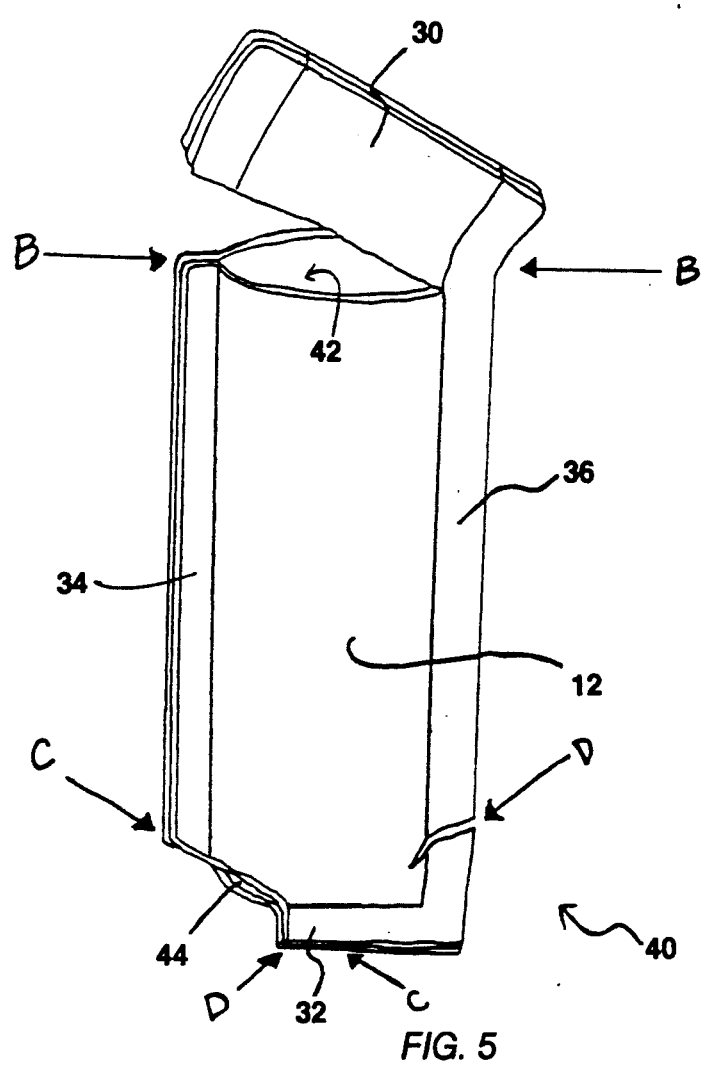
FIG. 5 is a perspective view of the first package being transformed into a sprouter pocket.

Referring now to FIGS. 4 and 5, the seeds 16 are removed from the first package 40 by cutting, tearing, or otherwise severing the outside corner 44 along line C—C (shown in FIG. 5) of the first package 40. The seeds 16 are then prepared by soaking in water as described in FIG. 10.

Referring again to FIGS. 4 and 5, the first package 12 is transformed into a sprouter pocket 40 (specifically shown in FIG. 5) by cutting, tearing, or otherwise severing the first package 12 from the second package 14 along the divider seal 36 to isolate the first package 12. The width 39 of the divider seal 36 ensures that upon being severed from the second package 14, the first package 12 remains sealed. Specifically, the first package 12 remains sealed by a portion of the top edge 30, a portion of the bottom edge 32, the side edge 34 and a portion of the divider seal 36.

To completely transform the first package 12 into a sprouter pocket 40, the top edge 30 is also cut, torn, or otherwise severed, from the first package 12, as shown in FIG. 5 along lines B—B, for forming an opening 42 in the sprouter pocket 40. To allow for fluid intake or drainage, portions of the bottom seal 32, the side seal 34, and the divider seal 36 of the sprouter pocket 40 are further cut, torn, or otherwise severed, along the line D—D. The severed corners 44 and 45 function to provide intake/drainage holes in the sprouter pocket 40. With the transformation complete, the seeds 16 can be planted in the sprouter pocket 40.

Figure 10:
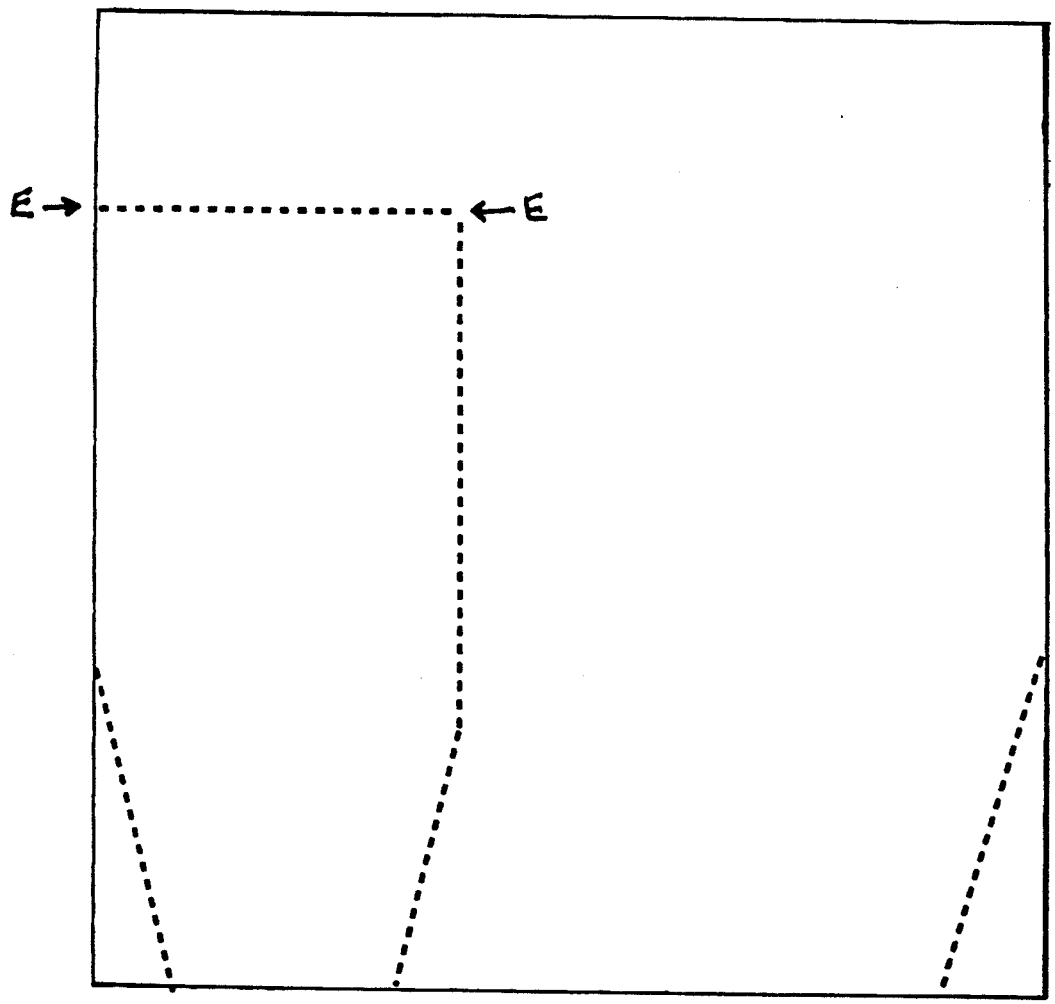
FIG. 10 is a view of a set of instructions printed on the kit of FIG. 1 for use with the present invention.

To plant the seeds 16, the soil 18 is removed from the second package 14 and prepared. It is then placed into the sprouter pocket 40 where the seeds 16 are then planted in the soil 18. With proper care and handling, the seeds 16 will sprout. A set of detailed but simple instructions, as shown in FIG. 10, can be printed, or otherwise placed, on the outside of either the first or second panel 20, 22 for use with the present invention. The instructions can also be printed separately and inserted into the second package 14. Also, note that the sprouter pocket 40 may be formed from the first package 12 by cutting, tearing, or otherwise severing, the first package 12 along substantially most of the divider seal 36 but then cutting, tearing, or otherwise severing, outward towards the side seal 34 as shown along line E—E in FIG. 10.

Advantageously, the sprouter pocket 40 is configured for enabling fluid to enter or drain while retaining the soil 18. Because the water may freely enter or drain from the sprouting pocket 40 through the holes provided by severed corners 44 and 45, little maintenance is required. As such, the present invention 10 is especially suited for children and novice tree-growers. With the instructions set forth on both the first package 12 and the second package 14, the children and the novice tree-growers can successfully grow trees, or other plants, from the seeds 16.

After the first package 12 has been transformed into the sprouter pocket 40 through removal of the top seal 30 and portions of the bottom seal 32, the side seal 34 and the divider seal 36, the sprouter pocket 40 is substantially flat as shown in FIG. 6. Being substantially flat and deformable, the sprouter pocket 40 is easily stored. However, upon being filled with the soil 18, or any other soil, the sprouter pocket 40 expands, as shown in FIGS. 7a and 7b, to accommodate any roots that are to be sprouted from the seeds 16. The sprouter pocket 40 has a rim portion 46 defining the opening 42 to allow for seedlings 48 sprouting from the seeds 16, and a pocket portion 48 for containing the roots sprouting from the seedling 48. When the sprouter pocket 40 is placed in water, any moisture required by the seedlings 48 can be absorbed through the intake/drainage holes provided by the severed corners 44 and 45. Likewise, any excess moisture can drain out of the sprouter pocket 40 through the intake/drainage holes. Self-contained and self-maintained, the sprouter pocket is particularly directed for use with children or novice tree-growers to successfully grow trees from seeds. Furthermore, the sprouter pocket 40, being constructed from the laminated sheet material, resists damage from exposure to moisture to retains its configuration through the sprouting of the seeds 16.

It will be recognized by those skilled in the art that the sprouter pocket 40, for example as illustrated in FIG. 6, may also be manufactured and sold to commercial growers as a separate product. Upon receipt, the commercial grower may insert the appropriate soil mixture and seeds as above described and follow the required procedures to effect sprouting.

Referring now to FIGS. 8 and 9 the first and second panels 20 and 22 can have various shapes and sizes according to the amount of the soil 18 or the shape and size of the seeds 16, or the shape and size of the second package 14. It is obvious that similar to transforming of the first package 12 into a sprouter pocket 40, the second package 14 can also be transformed into another sprouter pocket for use in sprouting herbs, flowers, teas, etc. Furthermore, additional panels 52 can be further joined to the first and second panels 20 and 22 for forming a variety of sprouting pockets. Also, the first and second panels 20 and 22 can be gussetted to facilitate the expansion of the sprouter pocket 40 when filled with the soil 18. A plurality of divider seals 36 can also be employed to form additional packages 54 for segregating sprouting elements, such as fertilizer 56, etc., in addition to the seeds 16 and the soil 18.

Although the invention has been described in terms of a preferred embodiment thereof, other embodiments that are apparent to those of ordinary skill in the art are also within the scope of the invention. For example, the seeds may be seeds of any variety, such as vegetables, herbs, garden flowering plants, teas, and the like. Also, perforations may be provided to facilitate the cutting, tearing or otherwise severing required to transform the first and/or second packages into sprouter pockets. Accordingly, the scope of the invention is intended to be defined only by reference to the appended claims.

What is claimed is:

1. A seed-sprouting kit, in two discrete packages joined by a seal, comprising:
   (A) a first package containing dormant seeds and used for sprouting the seeds therein; and
   (B) a second package severably attached to said first package and said second package containing elements used to sprout the seeds.

2. The seed-sprouting kit of claim 1 further comprising:
   (A) a divider seal positioned between said first and second packages for segregating the elements contained in said packages.

3. The seed-sprouting kit of claim 2 wherein said divider seal has a divider seal having a width for facilitating severing of the first package from the second package.

4. The seed-sprouting kit of claim 1 wherein the first package contains the seeds.

5. The seed-sprouting kit of claim 1 wherein the elements of the second package include soil.

6. A seed-sprouting kit, in two discrete packages joined by a seal, comprising:
   (A) a sprouter pocket containing seeds therein;
   (B) a package severably attached to the sprouter pocket for holding elements used to sprout at least one seed; and
   (C) a divider seal positioned between said sprouter pocket and said package for facilitating severing of said package from the sprouter pocket.

7. The seed-sprouting kit of claim 6 wherein said sprouter pocket comprises:
   (A) a rim portion defining an opening; and
   (B) a pocket portion comprising two opposed panels, one of said panels having edges joined with edges of the other of said panels by a side seal, a bottom seal and a portion of the divider seal.

8. The seed-sprouting kit of claim 6 wherein a portion of said side, bottom and divider seal are severable for forming intake/draining holes.

9. A seed-sprouting kit for maintaining seeds in dormancy and for sprouting the seeds, in two discrete packages joined by a seal, comprising:
   (A) a first panel having a first set of edges;
   (B) a second panel, opposing said first panel, having a second set of edges, said second set of edges joined with said first set of edges of said first panel to form a peripheral seal; and
   (C) a divider seal joining opposing strip portions of said first and second panels and forms first and second segregated packages, said seeds being contained in said first package and soil being contained in said second package.

10. The seed-sprouting kit of claim 9 wherein said panels and said divider seal are constructed of a deformable, laminated sheet material.

11. A method for sprouting seeds, comprising the steps of:
    (A) forming a sprouter pocket having a rim portion and a pocket portion, comprising the steps of:
       (1) opposing a first and second panel, each panel being constructed of a sheet material and each having outer edges;
       (2) sealing together side and bottom portions of said first edges to side and bottom portions of said second edges opposing said portions of the first edges to form side and bottom seals defining said pocket portion; and
       (3) severing portions of said side and bottom seals to form intake/drainage holes to form said sprouter pocket from said pocket portion;
    (B) filling said sprouter pocket with prepared soil;
    (C) positioning prepared seeds in said soil within said sprouter pocket; and
    (D) positioning said sprouter pocket in water.

* * * * *